United States Patent
Van Der Zee et al.

(10) Patent No.: US 7,177,274 B2
(45) Date of Patent: Feb. 13, 2007

(54) METHODS OF TRANSMITTING DATA PACKETS WITHOUT EXCEEDING A MAXIMUM QUEUE TIME PERIOD AND RELATED DEVICES

(75) Inventors: Thomas Martinus Van Der Zee, Enchede (NL); Wilhelmus Gerhardus Nitert, Eindhoven (NL); Jan Aberg, Lund (SE); Stefan Nilsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1063 days.

(21) Appl. No.: 10/174,840

(22) Filed: Jun. 19, 2002

(65) Prior Publication Data

US 2003/0235202 A1    Dec. 25, 2003

(51) Int. Cl.
*H04L 12/26* (2006.01)
*H04L 12/28* (2006.01)

(52) U.S. Cl. .................. 370/230; 370/412; 370/428; 370/465

(58) Field of Classification Search ............... 370/412, 370/428, 229, 230, 465
See application file for complete search history.

(56) References Cited

U.S. PATENT DOCUMENTS

| | | | |
|---|---|---|---|
| 6,247,058 B1 | 6/2001 | Miller et al. | |
| 2002/0041592 A1* | 4/2002 | Van Der Zee et al. | 370/389 |
| 2002/0089927 A1* | 7/2002 | Fischer et al. | 370/229 |
| 2003/0112822 A1* | 6/2003 | Hong et al. | 370/469 |
| 2004/0218617 A1* | 11/2004 | Sagfors | 370/412 |

FOREIGN PATENT DOCUMENTS

| | | |
|---|---|---|
| WO | WO 01/63858 | 8/2001 |
| WO | WO 02/37754 | 5/2002 |

OTHER PUBLICATIONS

Rathi, Sailesh; "Blue Tooth Protocol Architecture," Dedicated Systems Magazine, 2000 Q4, pp. 28-33, (http://www.dedicated-systems.com/magazine/00q4/rtm004big.html) no month available.
palowireless, Bluetooth Resource Center, Bluetooth Radio, http://www.palowireless.com/infotooth/tutorial/radio.asp, Apr. 20, 2002, pp. 1-3.
palowireless, Bluetooth Resource Center, Bluetooth Baseband, http://www.palowireless.com/infotooth/tutorial/baseband.asp, Apr. 20, 2002, pp. 1-8.

(Continued)

*Primary Examiner*—Chau Nguyen
*Assistant Examiner*—U-Lun Wang (57) ABSTRACT

Methods of transmitting data can include providing a data packet in a transmit buffer and providing a delay bound time period within which the data packet should be transmitted after being provided in the transmit buffer. After providing the data packet in the transmit buffer, a determination can be made if there is sufficient time to transmit the data packet before expiration of the delay bound time period. If there is insufficient time to transmit the data packet before expiration of the delay bound time period, the data packet can be flushed without initiating transmission of the data packet. Related devices are also discussed.

14 Claims, 6 Drawing Sheets

OTHER PUBLICATIONS palowireless, Bluetooth Resource Center, Link Manager Protocol (LMP), http://www.palowireless.com/infotooth/tutorial/lmp.asp. , Apr. 20, 2002, pp. 1-10.

palowireless, Bluetooth Resource Center, Host Controller Interface (HCI), http://www.palowireless.com/infotooth/tutorial/hci.asp, Apr. 20, 2002 pp. 1-5.

palowireless, Bluetooth Resource Center, Logical Link Control and Adaptation Protocol, http://www.palowireless.com/infotooth/tutorial/l2cap.asp, Apr. 20, 2002, pp. 1-5.

palowireless, Bluetooth Resource Center, RFCOMM Protocol, http://www.palowireless.com/infotooth/tutorial/rfcomm.asp, Apr. 20, 2002, pp. 1-8.

palowireless, Bluetooth Resource Center, Service Discovery Protocol (SDP), http://www.palowireless.com/infotooth/tutorial/spd. , Apr. 20, 2002, pp. 1-6.

palowireless, Bluetooth Resource Center, Bluetooth Profiles, http://www.palowireless.com/infotooth/tutorial/profiles.asp, Apr. 20, 2002, pp. 1-4.

Anonymous: "Use of Queueing Delay for Data Transmission Flow Control",IBM Technical Disclosure Bulletin, vol. 38, No. 8 (Aug. 1, 1995) pp. 507-508 XP 001092867 New York, USA.

Standard Search Report of European Patent Office,. EPO file RS 108603, Feb. 13, 2003.

* cited by examiner

METHODS OF TRANSMITTING DATA PACKETS WITHOUT EXCEEDING A MAXIMUM QUEUE TIME PERIOD AND RELATED DEVICES

FIELD OF THE INVENTION

The present invention relates to the field of communications and more particularly to communications methods, devices, and computer program products.

BACKGROUND OF THE INVENTION

Radio communications systems and methods can be used to transmit and receive data. Bluetooth, for example, is an open specification for a radio system that provides a network infrastructure to enable short range wireless communication of data and voice. It comprises a hardware component and a software component. The specification also describes usage models and user profiles for these models.

Bluetooth radios may operate in the unlicensed ISM band at 2.4 Gigahertz using 79 channels between 2.400 GHz to 2.4835 GHz (23 channels in some countries). The range for Bluetooth communication may be on the order of 0–30 feet (10 meters) with a power consumption of 0 dBm (1 mW). This distance can be increased to 100 meters by amplifying the power to 20 dBm. The Bluetooth radio system may be optimized for mobility.

The baseband and the Link control layers enable the physical RF link between Bluetooth devices to form a piconet. Both circuit and packet switching can be used. Two kinds of physical links can be provided using the baseband packets: Synchronous connection oriented links (SCO) and Asynchronous connectionless links (ACL). The ACL link may provide a packet switched link typically suitable to carry data traffic, while the SCO link may provide a circuit switched link typically suitable to carry audio traffic.

The link manager protocol is responsible for the link setup between Bluetooth units. This protocol layer caters to issues of security such as authentication, encryption by generating, exchanging and checking the link and encryption keys. It also deals with control and negotiation of link parameters such as baseband packet sizes.

The Bluetooth logical link control and adaptation layer supports higher level multiplexing, segmentation and reassembly of packets, and Quality of Service (QoS) communication and Groups. This layer may use the baseband ARQ to ensure reliability. Channel identifiers may be used to label each connection end point.

Bluetooth protocols are discussed, for example, in the reference by Sailesh Rathi entitled "BlueTooth Protocol Architecture" (Dedicated System Magazine, 2000 Q4, pages 28–33). Bluetooth protocols are also discussed in the reference by Brent A. Miller et al. entitled "BLUETOOTH REVEALED: The Insider's Guide To An Open Specification For Global Wireless Communications" (Prentice Hall PTR, Upper Saddle River, N.J., 2001). Both of these references are hereby incorporated herein in their entirety by reference.

SUMMARY OF THE INVENTION

According to embodiments of the present invention, methods of transmitting a packet of data can include providing a data packet in a transmit buffer, and providing a delay bound time period within which the data packet should be transmitted after being provided in the transmit buffer. After providing the data packet in the transmit buffer, a determination can be made if there is sufficient time to transmit the data packet before expiration of the delay bound time period. If there is insufficient time to transmit the data packet before expiration of the delay bound time period, the data packet can be flushed without initiating transmission of the data packet.

According to additional embodiments of the present invention, methods of transmitting a packet of data can include providing a data packet in a transmit buffer, and providing a maximum queue time period for the data packet from providing the data packet in the transmit buffer to selecting the data packet for transmission. An actual queue time period can be determined from providing the data packet in the transmit buffer, and the actual queue time period can be compared with the maximum queue time period for the data packet. If the actual queue time period is greater than the maximum queue time period for the data packet, the data packet can be flushed without initiating transmission of the data packet.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
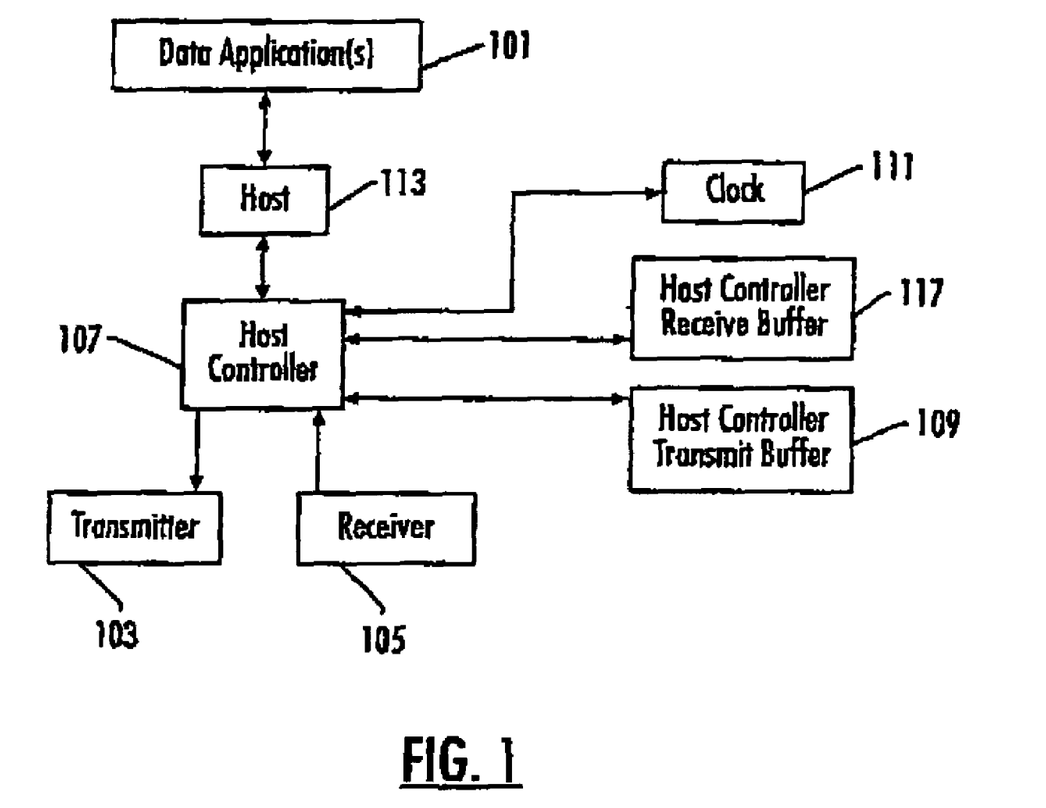
FIG. 1 is a block diagram illustrating communications devices according to embodiments of the present invention.

Aspects of the present invention can be implemented in Bluetooth devices according to embodiments of the present invention as discussed, for example, with respect to FIG. 1. Embodiments of the present invention, however, can also be implemented in devices operating according to other communications protocols.

As shown in FIG. 1, a communications device, such as a Bluetooth device, may include one or more data applications 101 that transmit and receive data using transmitter 103 and receiver 105. As shown, the data application 101 may provide digital data to the host 113 of a Logical Link Control and Adaptation (L2CAP) layer for transmission. The Host 113 can arrange the data into L2CAP data packets that are sequentially stored by the Host Controller 107 in the Host Controller Transmit Buffer 109 until time for transmission. When resources are available for transmission, the next L2CAP data packet in the Host Controller Transmit Buffer is selected for transmission by the Host Controller 107. Similarly, the Bluetooth device may receive baseband data through receiver 105 wherein the Host Controller 107 assembles received baseband data at the Host Controller receive buffer 117 into L2CAP data packets that are provided through the Host 113 to the data application(s) 101. When transmitting data through transmitter 103 to another Bluetooth device, the other Bluetooth device may reply with acknowledgements of receipt that are received through receiver 105.

An interface of the Host 113 can divide data of the selected L2CAP data packet into a plurality of HCI data packets and provided to the Host Controller 107 over an HCI interface therebetween. The Host Controller 107 can store the L2CAP data packet as a plurality of HCI data packets in the Host Controller Transmit Buffer 109. The HCI data packets can be further divided by a Baseband portion of the Host Controller into baseband data packets as discussed in more detail with regard to FIG. 2. The Baseband data packets can then be transmitted by transmitter 103. Alternatively, the L2CAP data packets can be converted directly into baseband data packets without the intermediate conversion into HCI data packets. In other words, the L2CAP data packets can be provided from the Host 113 to the Host Controller 107 and stored in the transmit buffer 109 without conversion to HCI data packets.

Figure 2:
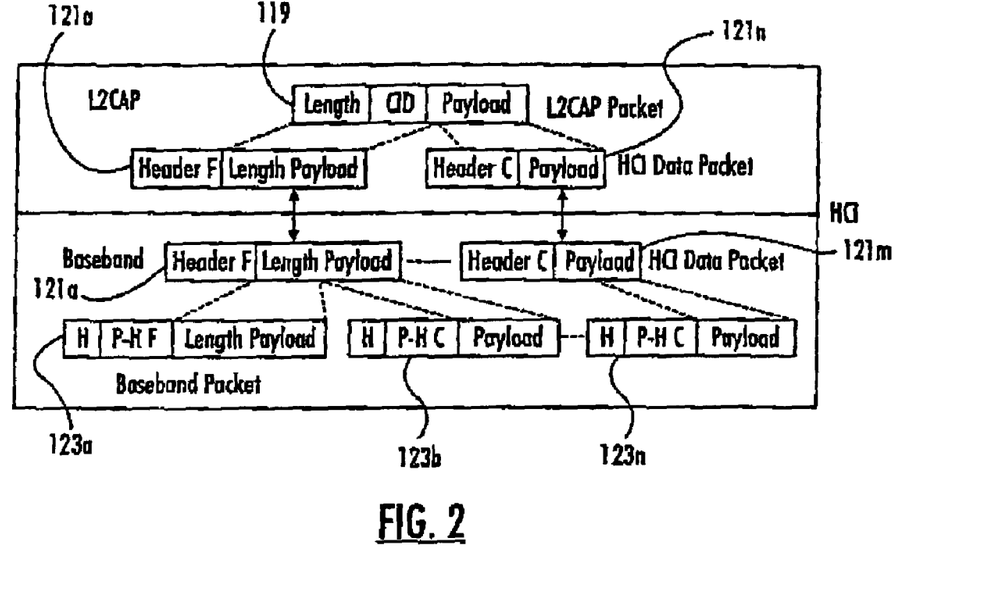
FIG. 2 is a block diagram illustrating protocol layers of communications devices according to embodiments of the present invention.

The Bluetooth protocol stack may thus include the Logical Link Control And Adaptation (L2CAP) Layer and the Baseband protocol layer with a Host Controller Interface (HCI) Layer therebetween as shown in FIG. 2. Alternatively, the HCI Layer may be omitted so that only the L2CAP and Baseband protocol layers are used in a Bluetooth transmitter. According to embodiments illustrated in FIG. 2, the L2CAP layer provides relatively large L2CAP data packets 119 to be stored in the host controller transmit buffer 109, and the L2CAP data packets can be broken into smaller packets referred to as HCI data packets 121a–m at the host controller interface HCI. For each HCI data packet corresponding to a given L2CAP data packet, a header indicates if the HCI data packet is a first segment F or a continuation segment C. The Baseband layer may further segment each HCI data packet into a plurality of Baseband packets 123a–n at the baseband controller 115, and each Baseband packet may include a header indicating if the Baseband packet is a first Baseband packet P-H F of the L2CAP data packet or a continuation packet P-H C of the L2CAP data packet. See, for example, Section 1.1 of the Bluetooth specification (BT-SPEC-1.1).

Figure 3:
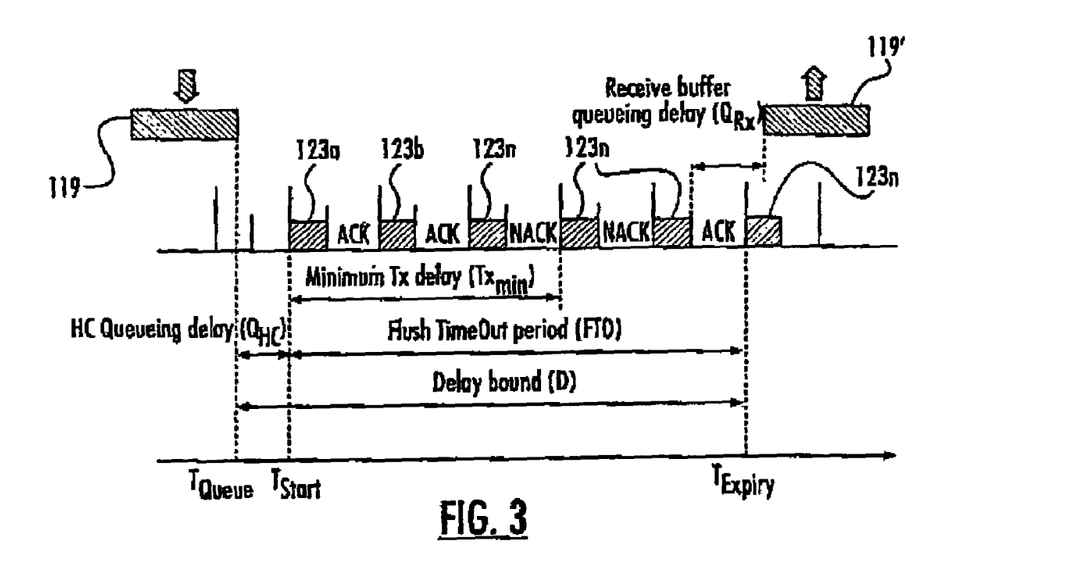
FIG. 3 is a timing diagram illustrating timing periods of communications protocols according to embodiments of the present invention.

As shown in FIG. 3, a Flush Timeout (FTO) Period according to the Bluetooth specification can limit the transmission time allowed for a L2CAP data packet 119, including any retransmissions of any baseband packets 123a–n corresponding to the L2CAP data packet 119. The FTO period for a L2CAP data packet 119 begins when transmission of the first Baseband packet 123a of the L2CAP data packet 119 from transmitter 103 begins, and transmission and retransmission of Baseband packets corresponding to the L2CAP data packet is only allowed during the FTO period. On receipt of the baseband data packets 123a and 123b at the corresponding receiving device, an acknowledge message ACK is transmitted from the corresponding receiving device to the transmitting device. If a baseband data packet is not successfully received, there will be no acknowledge message NACK, and the baseband data packet will be retransmitted until either an acknowledge message is received or the FTO period expires.

At the receiving device, the baseband data packets are received and reassembled into the received L2CAP data packet 119'. If all baseband data packets for the L2CAP data packet are successfully received, the received L2CAP data packet 119' assembled at the receiving device will correspond to the L2CAP data packet 119 transmitted by the transmitting device. If not all of the baseband data packets are received at the receiving device within the FTO Period, the partially received L2CAP data packet 119' received at the receiving device will be flushed as will be the partially transmitted L2CAP data packet 119 at the transmitting device. A length field of an L2CAP data packet can be used at the receiver to determine if a partial and/or whole L2CAP data packet has been received, and this information can be used to flush partially received data packets.

When the FTO period for an L2CAP data packet 119 expires and there has been no acknowledgement of the last baseband packet 123n being received at the corresponding receiving device, the L2CAP data packet 119 is flushed from the Host Controller Buffer 109, and transmission of Baseband data packets 123a–n corresponding to the flushed L2CAP data packet 119 is discontinued. In addition, when an L2CAP data packet that has been flushed was not yet completely stored in the Host Controller buffer, any continuation segments for the flushed L2CAP data packet will be flushed until there is a First segment of a next L2CAP data packet.

A separate FTO period may be defined for different asynchronous connectionless (ACL) links. In addition, an FTO period may be defined for each direction separately on an ACL link. The FTO period may be the same for each L2CAP packet transmitted over a same ACL link in the same direction.

FIG. 3 further illustrates components that constitute the baseband transfer delay period. The baseband transfer delay period can be defined as the time period between offering the L2CAP packet to the baseband layer from the Host controller transmit buffer 109 at the transmitting device and receiving the complete L2CAP data packet at the receiving device. When the L2CAP data packet is offered to the Baseband, it is stored in the host controller transmit buffer 109. The L2CAP data packet remains stored in the host controller transmit buffer 109 until either a positive acknowledgement is received for the last baseband data packet of the L2CAP data packet, or until the L2CAP transmission fails and the L2CAP data packet is flushed from the host controller transmit buffer 109.

The time when the L2CAP data packet is stored in the host controller transmit buffer 109 is designated $T_{Queue}$. More particularly, $T_{Queue}$ can be defined as the time when a first HCI data packet of the L2CAP data packet is stored in the host controller transmit buffer. Any continuation HCI data packets of the L2CAP data packet may be stored in the host controller transmit buffer after $T_{Queue}$.

$T_{Start}$ is the time when the first baseband packet of the L2CAP data packet is transmitted, and the FTO period begins at $T_{Start}$. The FTO period can be defined as a maximum time period after the start of transmission of the L2CAP data packet after which no baseband data packet transmissions/retransmissions for the L2CAP data packet will be allowed and the L2CAP data packet will be flushed from the host controller transmit buffer. The host controller queuing delay $Q_{HC}$ is defined as the time between queuing the L2CAP data packet in the host controller transmit buffer and the start of the L2CAP data packet transmission $T_{Start}$.

The delay bound time period D can be a maximum delay allowed from $T_{Queue}$ for transmission of a L2CAP data packet imposed by a higher layer of the Bluetooth protocol. In other words, the delay bound time period can be a maximum time period that the Baseband layer is allowed to waste resources attempting to transfer an L2CAP data packet. Accordingly, the delay bound time period can define a maximum time period for both queuing and transmission delays. The delay bound time period thus defines the expiry time $T_{expiry}$ after which the baseband should not waste resources trying to transmit baseband packets for an L2CAP data packet.

A minimum L2CAP transmission time $Tx_{min}$ is defined as a minimum time required to transmit an L2CAP data packet to provide a high likelihood of successful transmission. The minimum L2CAP transmission time is defined to prevent the start of transmission of an L2CAP data packet which is not likely to be successful before the expiry time. The minimum L2CAP packet transmission time is not necessarily the same for all L2CAP data packets, but instead may vary depending on the L2CAP data packet size, the baseband packet type selection, any baseband re-transmissions, bandwidth made available during scheduling, and receive buffer queuing delay.

The L2CAP packet size may be indicated by a length field of the L2CAP data packet, or the L2CAP packet size can be derived from an amount of data received between consecutive HCI First Segments when the L2CAP packet length is fixed. A longer L2CAP data packet may thus have a longer minimum L2CAP transmission time.

The baseband packet type selection may depend on the L2CAP packet size and the error conditions on the air-interface. Moreover, the packet type selection may change during transmission of an L2CAP data packet, for example, if error conditions change. Given a L2CAP data packet size and a fixed packet type selection, a minimum L2CAP transmission time can be defined.

A number of baseband re-transmissions during a L2CAP data packet transmission may depend on error conditions over the air-interface and the packet type selection. Measurements of error conditions in the past can be used to estimate error conditions in the future. Examples of link conditions that can be measured include Receiver Signal Strength Indication (RSSI) and numbers of retransmissions. An estimation of expected error conditions can be taken into account to determine a minimum transmission time. This estimation, however, may be treated differently than other parameters listed above because this estimation is based on statistical data. An estimation of error conditions is not a guarantee that the transmission will either fail or be successful.

An amount of bandwidth available to transmit an L2CAP packet may be difficult to estimate. Even if a bandwidth reservation mechanism such as a Link Manager Protocol (LMP) Quality of Service is used, there may only be a minimum guaranteed bandwidth. An estimation of available bandwidth, however, may still be useful in determining a minimum L2CAP transmission time. The minimum L2CAP transmission time is thus not an absolute minimum time required for transmission of an L2CAP data packet, because it is possible that an L2CAP data packet may be transmitted in less than the minimum transmission time. Instead, the minimum transmission time is an expected minimum time needed to transmit a L2CAP data packet.

The receive buffer queuing delay ($Q_{Rx}$) is the time after the last Baseband packet of the L2CAP packet has been received successfully at the receiving device, and the time when the L2CAP packet is transferred to a higher level of the receiving device. At the receiving device, Baseband data packets are "re-assembled" into HCI data packets, which are transferred to the higher layer of the protocol. HCI data packets maintain the L2CAP packet boundaries, and according to some embodiments, a policy can be implemented such that HCI data packets may be filled to the greatest extent possible. Accordingly, a L2CAP data packet may only be transferred to the higher layer when the first Baseband packet of the next L2CAP packet is received. An additional queuing delay may thus be introduced in the receive buffer at the Baseband Layer. This queuing delay, however, may be reduced for delay sensitive applications that have stringent delay requirements such as low bit-rate speech codecs that may generate a relatively short speech frame each 20 ms. For this type of application, an additional queuing delay in the receive buffer may be introduced equal to the inter-arrival time of the L2CAP packets, when the HCI transfer policy is triggered by a next First indication.

The total Baseband transfer delay of an L2CAP data packet can thus be defined as a sum of: the queuing delay in the Host Controller transmit buffer and in the Baseband; the L2CAP packet transmission delay including potential Baseband packet retransmission delays; and the queuing delay in the receive buffer in the Baseband before the information is transferred to the higher layer. Delay sensitive traffic may require control over the total Baseband transfer delay. For delay sensitive applications, a certain "life-time" can be defined for an L2CAP data packet. After the lifetime of the L2CAP data packet has passed, the data is of no use to the application. For example, when Audio/Nideo frames arrive at the Playback buffer after their playback time, they can be discarded.

Only the L2CAP packet transmission delay, however, is controlled by a Flush Timeout (FTO) period of the Bluetooth protocol. The Bluetooth specification does not generally provide control over the queuing delays at a transmitting or receiving device. The lack of queuing delay control may be that both buffer space and air-interface transmission capacity can be wasted for L2CAP data packets for which the life-time has expired. In addition, it may be difficult to guarantee that there is a maximum baseband transfer delay.

According to embodiments of the present invention, a timestamp can be assigned to each L2CAP data packet when it is stored in the Host Controller buffer, and this timestamp can be used to determine whether or not to initiate transmission of the associated L2CAP data packet at the time the L2CAP data packet is ready for transmission. More particularly, the timestamp can be used to calculate an expiry time for the associated L2CAP data packet.

Figure 4:
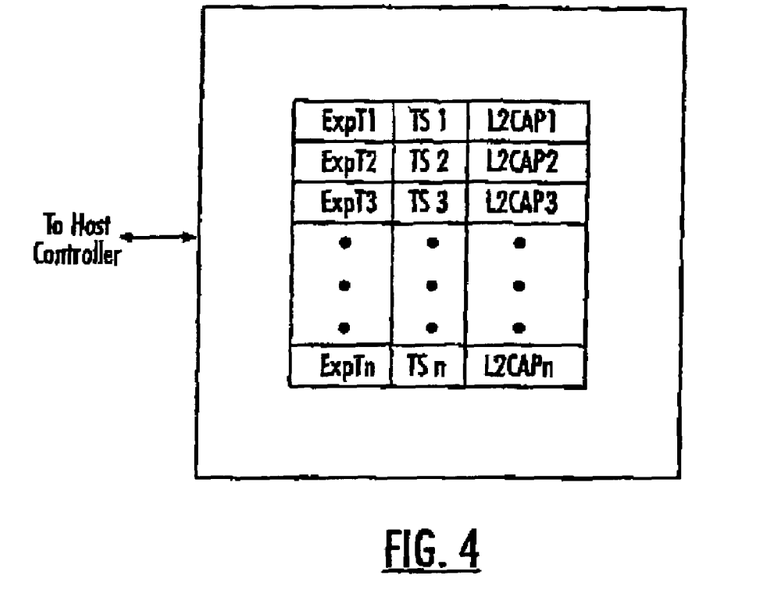
FIG. 4 is a block diagram of a transmit buffer according to embodiments of the present invention.

The host controller 107 of FIG. 1 can assign Timestamps for each L2CAP data packet based on the output of the clock 111 when the L2CAP data packet is stored in the host controller transmit buffer 109. The host controller 107 can also calculate an expiry time for each L2CAP data packet when the L2CAP data packet is stored in the host controller transmit buffer 109. An example of a host controller transmit buffer according to embodiments of the present invention is illustrated in FIG. 4. As shown, each L2CAP data packet L2CAP1-n can be stored in a queue in the host controller transmit buffer with an associated timestamp TS1-n and an associated expiry time ExpT1-n. Each timestamp and/or expiry time can be appended to the associated L2CAP data packet in the transmit buffer, or related queues can be maintained for the timestamps and/or expiry times in the transmit buffer. If the expiry times are stored in the transmit buffer, it may not be necessary to store the timestamps because the flush procedures can be executed based on the expiry times. If the timestamps are stored in the transmit buffer, it may not be necessary to store the expiry times in the transmit buffer because the expiry times can be calculated as needed.

The L2CAP data packets can be selected for transmission in the order stored in the transmit buffer as baseband resources are made available. A comparison of the expiry time of a new L2CAP data packet can be used to determine the placement of the new L2CAP data packet in the transmit buffer queue so that the L2CAP data packet with the expiry time that will expire soonest is in order for next transmission when L2CAP data packets have a same lifetime. Alternatively, the transmit buffer can store the L2CAP data packets in the order received such that the first L2CAP data packet stored is the first in line to be transmitted.

The expiry time $T_{Expiry}$ can be calculated as the queuing time $T_{Queue}$ plus a delay bound time period D. As discussed above, the L2CAP data packets can be stored in the transmit buffer in order of decreasing expiry times such that L2CAP data packets with the lowest expiry times are queued for the soonest transmission. According to embodiments of the present invention, once the expiry time has passed for a L2CAP data packet, the L2CAP data packet can be flushed from the transmit buffer without transmitting even if it has not yet been retrieved for transmission. Moreover, transmission of an L2CAP data packet can be prevented if a minimum time $Tx_{min}$ to transmit the L2ACP data packet is not available before the expiry time $T_{Expiry}$ of the L2CAP data packet.

According to embodiments of the present invention, a delay bound time period D, a minimum transmission time period $Tx_{min}$, and a FTO period can be defined for each L2CAP data packet. As discussed above, the minimum transmission time period $Tx_{min}$ can vary based on the size of the L2CAP data packet, the baseband packet type selection, an expected number of re-transmissions, an expected availability of bandwidth, etc. The delay bound time period D and the FTO period can be the same for each L2CAP data packet of the same ACL type.

Figure 5:
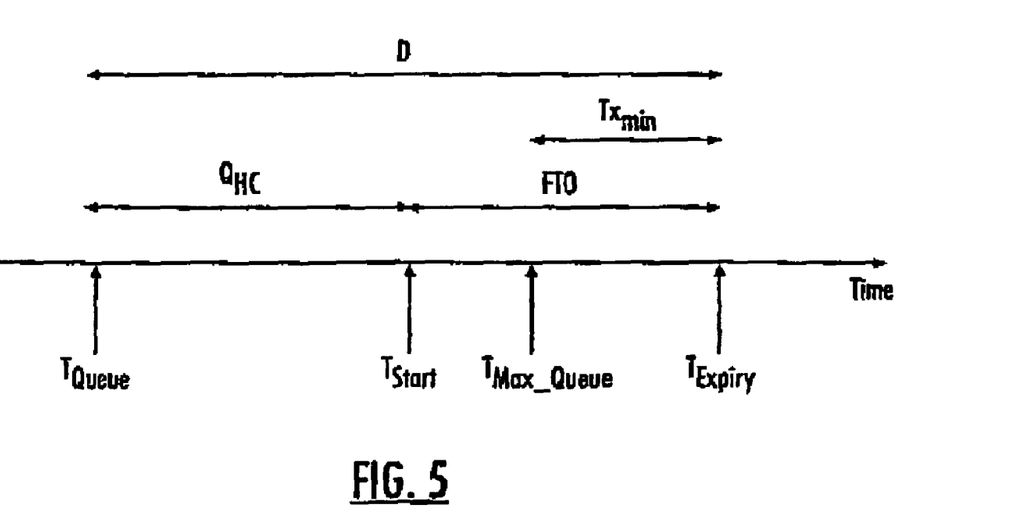
FIG. 5 is a timing diagram illustrating transmit delays according to embodiments of the present invention.

When a first segment of an L2CAP data packet is stored in the transmit buffer, the L2CAP data packet can be assigned a timestamp identifying the time the L2CAP data packet is queued ($T_{Queue}$) in the transmit buffer, as shown in FIG. 5. The timestamp can be determined as the output of the Host Controller Clock, such as a local Bluetooth clock, at time $T_{Queue}$. In a communications device operating according to Bluetooth protocols, the Bluetooth clock can generate a 26 bit output that is incremented at the clock rate so that the Bluetooth clock cycle is $2^{27}$.

When an L2CAP data packet is queued for transmission, $T_{Start}$ can be determined as the current time (the current output of the Host Controller Clock), and $T_{Start}$ and $T_{Queue}$ can be can be compared to determine a queuing delay for the L2CAP data packet in the Host Controller Buffer. When $T_{Start}$ is smaller than $T_{Queue}$, $T_{Start}$ has wrapped around to a next cycle of the clock so that $T_{Start}$ should be recalculated as $T_{Start}$ plus the maximum clock output for the comparison. In some Bluetooth devices, the maximum clock output is $2^{27}$ so that $T_{Start}$ can be recalculated as $T_{Start}+2^{27}$ when $T_{Queue}$ and $T_{Start}$ fall in different clock cycles. In other devices, the maximum clock cycle is $2^{28}$, so that $T_{Start}$ can be recalculated as $T_{Start}+2^{28}$ when $T_{Queue}$ and $T_{Start}$ fall in different clock cycles. Other clock cycles can also be used. A maximum queuing time can be calculated as:

$$T_{Max\_Queue} = T_{Queue} + D - Tx_{Min}.$$

When $T_{Start}$ is greater than or equal to $T_{Max\_Queue}$, there may be insufficient time to transmit the L2CAP data packet, and the L2CAP data packet can be flushed without initiating transmission of the data packet. When $T_{Start}$ is less than $T_{Max\_Queue}$, there should be sufficient time to transmit the L2CAP data packet, and transmission of the L2CAP data packet can be initiated.

In addition, the FTO period can be set for the L2CAP data packet based on a calculation of the actual start time $T_{Start}$. More particularly, the FTO period can be calculated as:

$$FTO = \min(T_{Queue} + D - T_{Start}, FTO)$$

so that the FTO period is the lesser of the specified FTO period or the time remaining within the delay bound period D after $T_{Start}$. Accordingly, a shorter FTO period may be provided if the queuing delay $Q_{HC}$ in the Host Controller is too long.

As discussed above, an L2CAP data packet may be segmented into one or more HCI data packets. According to the steps discussed above, the HCI data packets may be assigned and/or marked with the same queuing time $T_{Queue}$ assigned to the original L2CAP data packet when queued in the transmit buffer. According to some embodiments, the queuing time may be marked in only the first of a plurality of HCI data packets corresponding to a single L2CAP data packet.

In addition, queuing delays at a host controller receive buffer 117 can be reduced. In the communications device of FIG. 1, a separate logical receive buffer 117 can be provided where received baseband information can be stored for assembly into HCI and/or L2CAP data packets. As discussed above, the communications device may or may not require the intermediate conversion to HCI data packets so that received baseband data packets may be converted by the host controller directly into the L2CAP data packet. Accordingly, there may only be baseband packets stored in the host controller receive buffer that correspond to a single L2CAP data packet. Once an L2CAP data packet has been assembled, it can be passed up to the data application 101.

In other words, data received over an ACL logical link can be transferred to the next higher layer of the data application 101 as soon as the complete L2CAP data packet has been received, or when a maximum HCI data packet size has been reached. When a baseband data packet with a First indication in the Payload header is received, then an L2CAP packet length can be read to determine a length of the L2CAP data packet to be assembled. The packet length can be included in the first two bytes of the baseband payload. The Host Controller can thus determine when the complete L2CAP data packet has been received based on an amount of data received being equal to the known packet length. Once the Host Controller determines that the complete L2CAP data packet has been received, the Host Controller can pass the complete L2CAP data packet up to the data application 101.

When a next baseband packet with a First indication is received and there is still baseband data stored in the receive buffer corresponding to a previous L2CAP data packet, the previous L2CAP data packet can be transferred to the data application. In other words, the Host Controller can determine that there are no more baseband data packages corresponding to the previous L2CAP data packet because the First indication in the newly received baseband data packet indicates that a new L2CAP data packet is being started.

When a baseband data packet with a Continuation indication is received, the Host Controller can determine if the complete L2CAP data packet has been received based on the known length of the L2CAP data packet received with the first baseband data packet of the L2CAP data packet. If so, the complete L2CAP data packet can be transferred to the data application 101. Otherwise, data of the Continuation baseband data packet can be stored in the receive buffer.

If a new baseband data packet with a Continuation indication is received such that the data stored in the receive buffer plus the data of the new baseband data packet exceeds a maximum HCI data packet size, the data stored in the receive buffer may be transferred up to the data application before the new Continuation baseband data packet is stored in the receive buffer.

Embodiments of the present invention may thus provide higher layer control over a total baseband delay, and control over a total baseband delay may help support delay sensitive applications such as voice over IP or video applications. By providing control over a total baseband delay, wasting of air-interface bandwidth and/or Host Controller buffer space can be reduced for L2CAP data packets which have been queued for too long a period of time such that there may be insufficient time to transmit the complete transmission of the L2CAP data packet before the allowed expiry time. Moreover, embodiments of the present invention may be implemented without consuming a great deal of additional processing capacity.

As discussed above by way of example, aspects of the present invention can be embodied in communications devices operating according to Bluetooth protocols. Aspects of the present invention, however, can also be embodied in communications devices operating according to other wireless and/or wired communications protocols. Generic operations according to embodiments of the present invention are set forth below with reference to the flow charts of FIGS. 6 and 7 and the block diagram of FIG. 8, by way of example.

Figure 8:
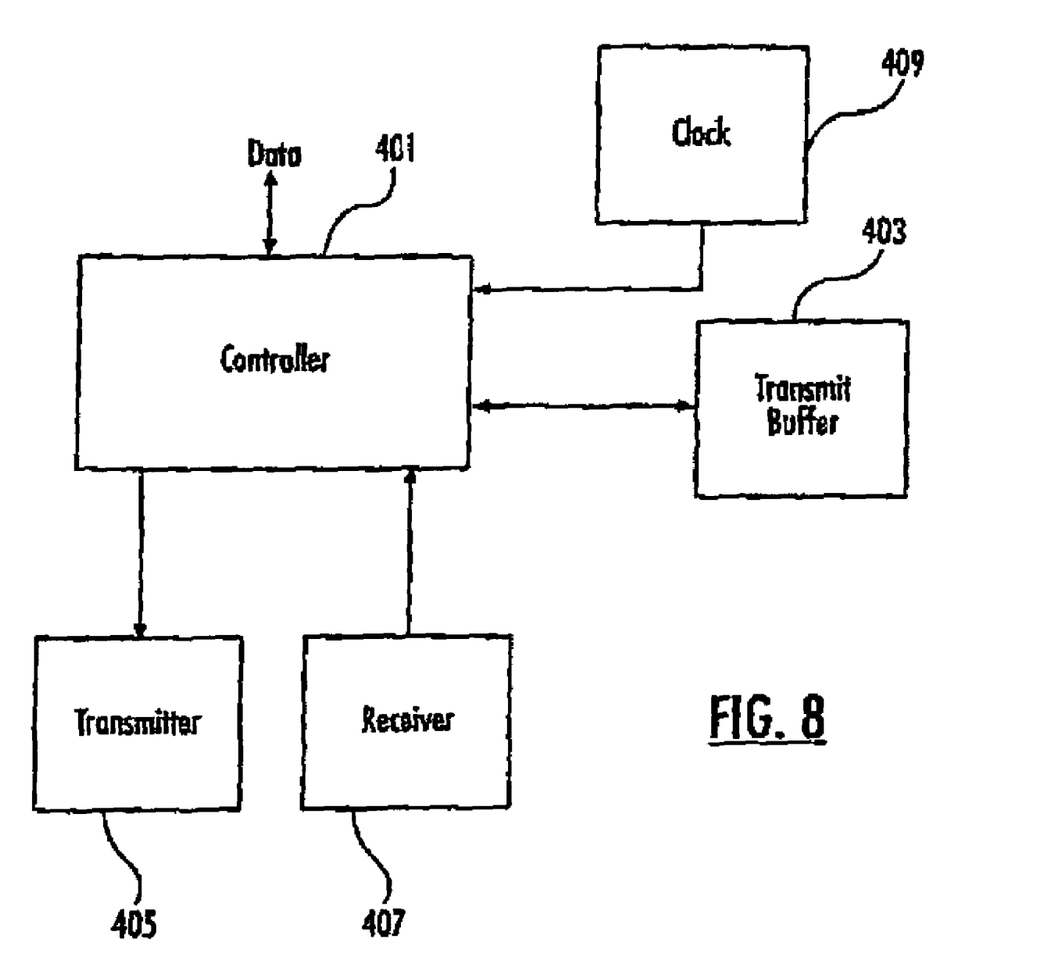
FIG. 8 is a block diagram illustrating communications devices according to additional embodiments of the present invention.

As illustrated in FIG. 8, communications devices according to embodiments of the present invention can include a controller 401 that processes data for transmission to other communications devices through transmitter 405 and that process data received from other communications devices through receiver 407. For data to be transmitted, the controller 401 can store data packets to be transmitted in transmit buffer 403. When a data packet has been selected for transmission, the controller 401 can retrieve the selected data packet from the transmit buffer 403 and transmit the packet through the transmitter 405. A clock 409 can be used by the controller to provide timestamps and/or calculate actual queue time periods for data packets stored in the transmit buffer, and to determine whether to flush a data packet and prevent transmission thereof.

Figure 6:
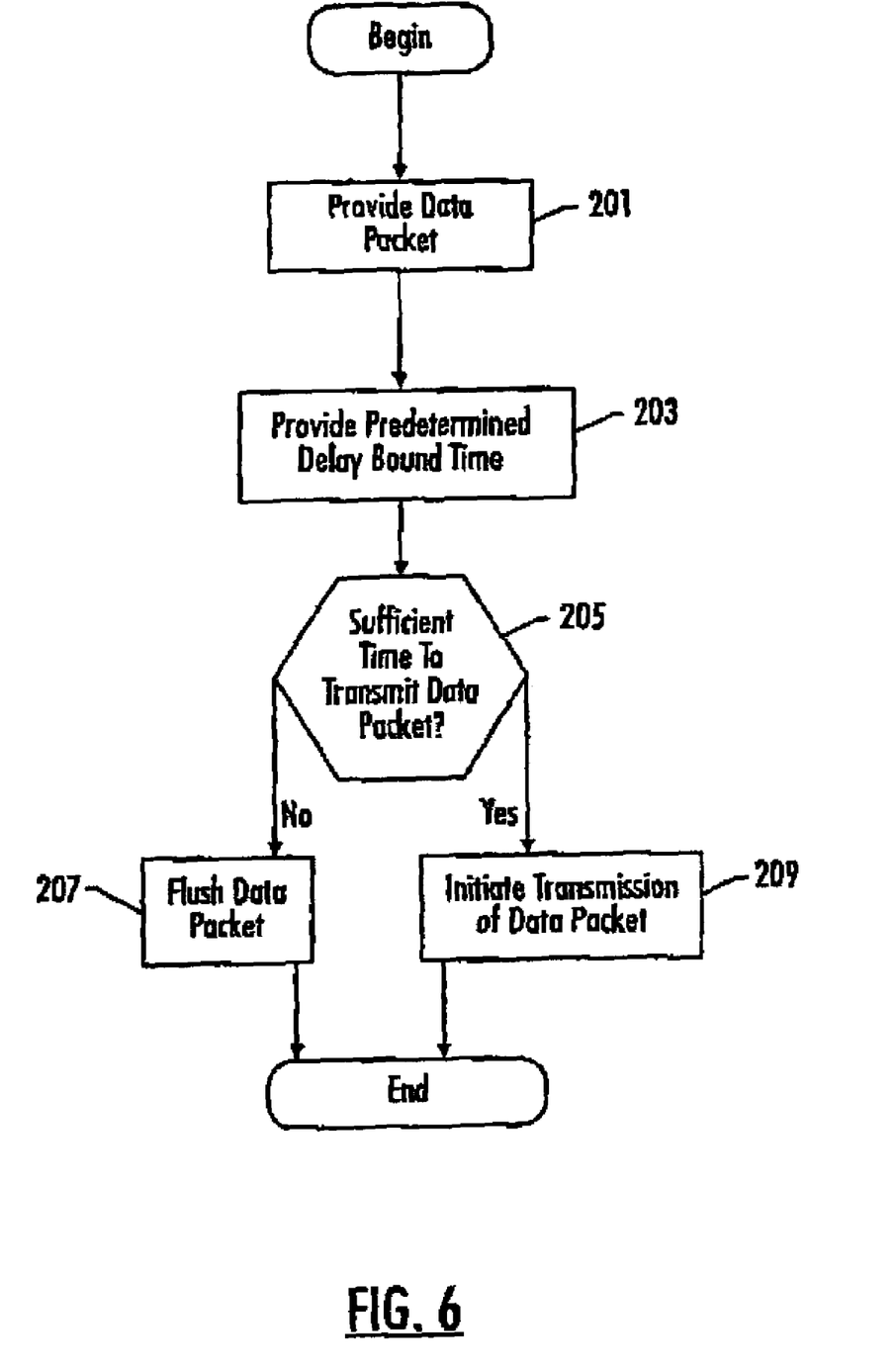
FIGS. 6 and 7 are flow charts illustrating operations of communications devices according to embodiments of the present invention.

As illustrated in FIG. 6, operations of transmitting a packet of data can include providing a data packet in a transmit buffer at block 201, and providing a delay bound time period within which the data packet should be transmitted after being provided in the transmit buffer at block 203. After providing the data packet in the transmit buffer, a determination can be made if there is sufficient time to transmit the data packet before expiration of the delay bound time period at block 205. If there is insufficient time to transmit the data packet before expiration of the delay bound time period, the data packet can be flushed at block 207 without initiating transmission of the data packet.

Determining if there is sufficient time to transmit the data packet at block 205 can be performed before selecting the data packet for transmission. Accordingly, data packets can be flushed from the transmit buffer as soon as a maximum allowable delay has been exceeded so that transmit buffer space can be saved.

Determining if there is sufficient time to transmit the data packet at block 205 can alternatively be performed after selecting the data packet for transmission such that the data packet may be maintained in the transmit buffer even though a delay in the transmit buffer may have already exceeded a maximum delay. If there is sufficient time to transmit the data packet before expiration of the delay bound time period after selecting the data packet for transmission, transmission of the data packet can be initiated. Accordingly, a single decision to flush the data packet or initiate transmission of the data packet can be made at the time a data packet is selected for transmission.

If there is sufficient time to transmit the data packet before expiration of the delay bound time period, a flush time out period can be defined within which the data packet should be transmitted after being selected for transmission. If transmission of the data packet is incomplete before expiration of the flush time out period, transmission of the data packet can be terminated. Moreover, defining the flush time out period can include selecting the minimum of a specified flush time out period or a difference between the delay bound time period and a queue time period defined as a period of time between providing the data packet in the transmit buffer and selecting the data packet for transmission. The queue time period can be defined to include some processing of the data packet before storing in the transmit buffer, or the queue time period may begin on storing the data packet in the transmit buffer. In addition, the queue time period can be defined to end as soon as the data packet is read from the transmit buffer for transmission, the queue time period can be defined to include converting data packets from the transmit buffer into baseband packets, and/or the queue time period can be defined to end when transmission actually begins. Moreover, the queue time period can be defined to include any portion of the time period from providing a data packet to the controller to initiating transmission of the data packet.

The operation of determining if there is sufficient time to transmit the data packet can include providing a maximum queue time period for the data packet between a time of providing the data packet in the transmit buffer and a time of selecting the data packet for transmission and determining if an actual queue time period for the data packet exceeds the maximum queue time period. If the actual queue time period exceeds the maximum queue time period, a determination can be made that there is insufficient time to transmit the data packet before expiration of the delay bound time period. More particularly, a timestamp can be assigned to the data packet in the transmit buffer corresponding to an output of a transmit clock when the data packet is provided in the transmit buffer, and the actual queue time period can be determined as a difference between the timestamp assigned to the data packet and an output of the transmit clock when the data packet is selected for transmission.

In addition, providing a data packet in the transmit buffer can include providing a plurality of data packets in the transmit buffer and assigning a timestamp can include assigning a respective timestamp to each of the plurality of data packets wherein each timestamp represents a time that the respective data packet was provided in the transmit buffer. Providing a maximum queue time period can include providing a respective maximum queue time period for each of the plurality of data packets. In addition, a first maximum queue time period for a first of the data packets can be different than a second maximum queue time period for a second of the data packets, and an order of the data packets in the transmit buffer can correspond to an order of the timestamps assigned thereto.

Figure 7:
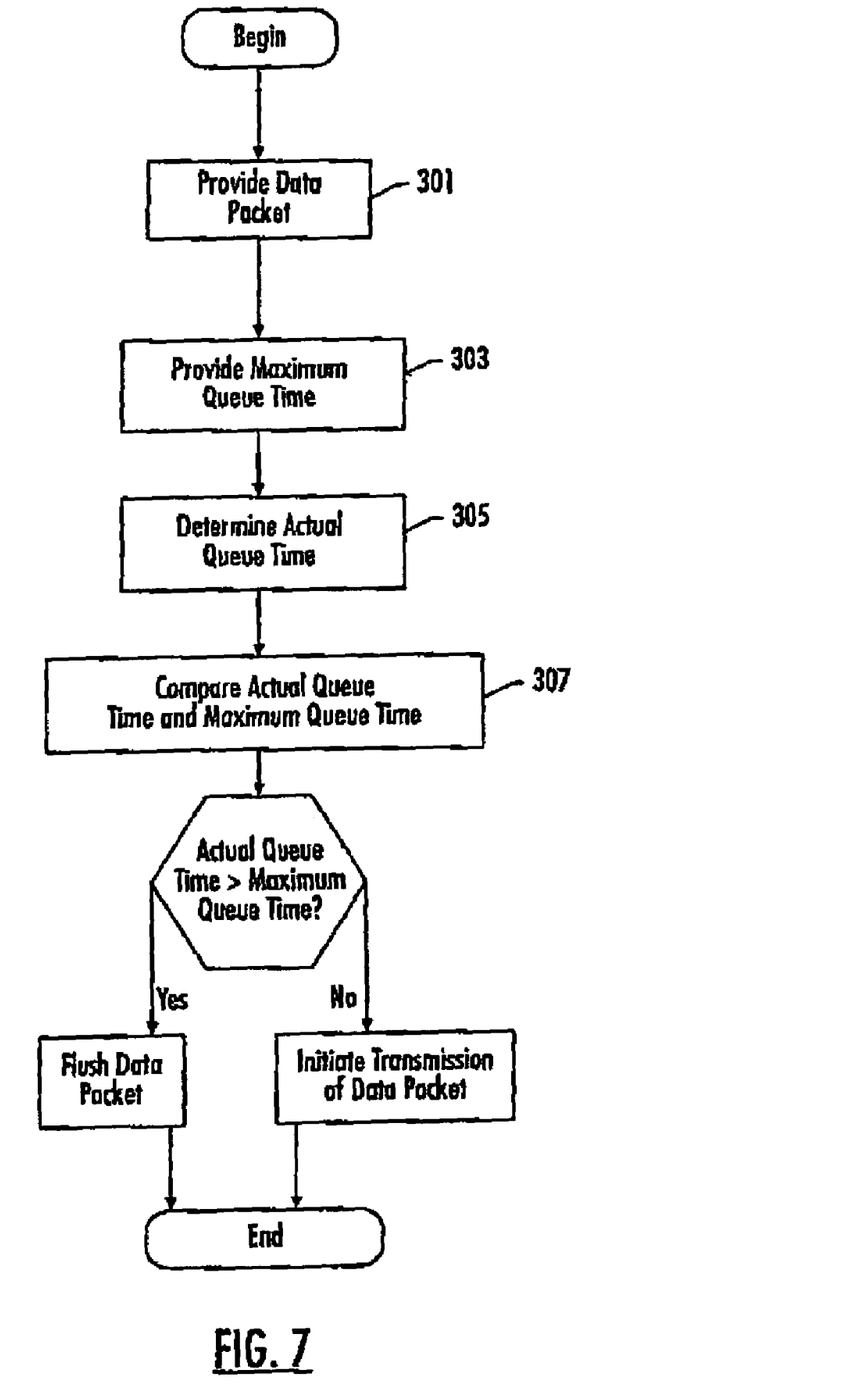

As illustrated in FIG. 7, operations of transmitting a packet of data according to additional embodiments of the present invention can include providing a data packet in a transmit buffer at block 301, providing a maximum queue time period for the data packet from providing the data packet in the transmit buffer to selecting the data packet for transmission at block 303, and determining an actual queue time period from providing the data packet in the transmit buffer at block 305. The actual queue time period can be compared with the maximum queue time period for the data packet at block 307. If the actual queue time period is greater than the maximum queue time period for the data packet at block 309, the data packet can be flushed at block 311 without initiating transmission of the data packet.

In addition, the data packet can be selected for transmission and determining the actual queue time period can include determining the actual queue time period from providing the data packet in the transmit buffer to selecting the data packet for transmission. In the alternative or in addition, the actual queue time period can be determined from providing the data packet in the transmit buffer before selecting the data packet for transmission. Accordingly, a data packet can be flushed as soon as the actual queue time exceeds the maximum queue time thereby freeing space in the transmit buffer. In the alternative, if the actual queue time period is less than the maximum queue time period after selecting the data packet for transmission at block 315, transmission of the data packet can be initiated.

In addition, a timestamp can be assigned to the data packet in the buffer when the data packet is provided in the transmit buffer wherein the timestamp represents a time that the data packet was provided in the transmit buffer. Determining the actual queue time period can thus include determining a difference in the timestamp and a time when the data packet was selected for transmission. In addition, providing a data packet can include providing a plurality of data packets in the transmit buffer, and assigning the timestamp can include assigning a respective timestamp to each of the plurality of data packets wherein each timestamp represents a time that the respective data packet was provided in the transmit buffer. Accordingly, providing a maximum queue time period can include providing a respective maximum queue time period for each of the plurality of data packets, and a first maximum queue time period for a first of the data packets can be different than a second maximum queue time period for a second of the data packets. In addition, an order of the data packets in the transmit buffer can correspond to an order of the timestamps assigned thereto. Moreover, the timestamp may be an output of a transmitter clock at a time the data packet is provided in the transmit buffer.

Operations of transmitting as discussed above in FIGS. 6 and 7 can be implemented in communications devices operating according to various protocols. For example and not by way of limitation, the transmit buffer can include a host controller buffer of a Bluetooth transmitter and the data packet can include a Logical Link Control And Adaptation Layer data packet according to the Bluetooth protocol. Operations of FIGS. 6 and 7 can also be implemented in communications devices operating according to different communications protocols according to alternative embodiments of the present invention. In addition, aspects of the present invention may be embodied as methods, systems, and/or computer program products. Accordingly, the present invention may be embodied in hardware and/or in software (including firmware, resident software, micro-code, etc.).

The flowcharts of FIGS. 6 and 7 show architectures, functionalities, and operations of exemplary implementations of software and data used, for example, by a controller 401 to control a communications device according embodiments of the present invention. In this regard, each block may represent a module, segment, or portion of code, which comprises one or more executable instructions for implementing the specified logical function(s). It should also be noted that in some alternative implementations, functions noted in the blocks may occur out of the order noted therein. For example, two blocks shown in succession may be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of transmitting a packet of data, the method comprising:
   providing a data packet in a transmit buffer;
   providing a delay bound time period within which the data packet should be transmitted after being provided in the transmit buffer;
   flushing the data packet without initiating transmission of the data packet if there is insufficient time to transmit the data packet before expiration of the delay bound time period;
   selecting the data packet for transmission;
   initiating transmission of the data packet if there is sufficient time to transmit the data packet before expiration of the delay bound time period after selecting the data packet for transmission;
   defining a flush time out period within which the data packet should be transmitted after being selected for transmission, wherein defining the flush time out period comprises selecting a minimum of a specified flush time out period or a difference between the delay bound time period and a queue time period defined as a period of time between providing the data packet in the transmit buffer and selecting the data packet for transmission; and
   terminating transmission of the data packet, if transmission of the data packet is incomplete before expiration of the flush time out period.

2. A method of transmitting a packet of data, the method comprising:
   providing a data packet in a transmit buffer;
   providing a delay bound time period within which the data packet should be transmitted after being provided in the transmit buffer; and
   if there is insufficient time to transmit the data packet before expiration of the delay bound time period, flushing the data packet without initiating transmission of the data packet, wherein determining if there is sufficient time to transmit the data packet comprises providing a maximum queue time period for the data packet between a time of providing the data packet in the transmit buffer and a time of selecting the data packet for transmission, determining if an actual queue time period for the data packet exceeds the maximum queue time period, and if the actual queue time period exceeds the maximum queue time period, determining that there is insufficient time to transmit the data packet before expiration of the delay bound time period.

3. A method according to claim 2 further comprising:
assigning a timestamp to the data packet in the transmit buffer corresponding to an output of a transmit clock when the data packet is provided in the transmit buffer; and
determining the actual queue time period as a difference between the timestamp assigned to the data packet and an output of the transmit clock when the data packet is selected for transmission.

4. A method according to claim 3 wherein providing a data packet in the transmit buffer comprises providing a plurality of data packets in the transmit buffer and wherein assigning a timestamp comprises assigning a respective timestamp to each of the plurality of data packets wherein each timestamp represents a time that the respective data packet was provided in the transmit buffer.

5. A method according to claim 4 wherein providing a maximum queue time period comprises providing a respective maximum queue time period for each of the plurality of data packets.

6. A method according to claim 5 wherein a first maximum queue time period for a first of the data packets is different than a second maximum queue time period for a second of the data packets.

7. A method according to claim 4 wherein an order of the data packets in the transmit buffer corresponds to an order of the timestamps assigned thereto.

8. A communications device comprising:
a transmitter configured to transmit data; and
a controller configured to provide a data packet in a transmit buffer and provide a delay bound time period within which the data packet should be transmitted after being provided in the transmit buffer, wherein if there is insufficient time to transmit the data packet before expiration of the delay bound time period, the controller flushes the data packet without initiating transmission of the data packet from the transmitter;
the controller further adapted to select the data packet for transmission, wherein if there is sufficient time to transmit the data packet before expiration of the delay bound time period after selecting the data packet for transmission, the controller being adapted to initiate transmission of the data packet;
if there is sufficient time to transmit the data packet before expiration of the delay bound time period, the controller adapted to define a flush time out period within which the data packet should be transmitted after being selected for transmission, and wherein if transmission of the data packet is incomplete before expiration of the flush time out period, the controller terminates transmission of the data packet, the controller defines further adapted to define the flush time out period by selecting the minimum of a specified flush time out period or a difference between the delay bound time period and a queue time period defined as a period of time between providing the data packet in the transmit buffer and selecting the data packet for transmission.

9. A communications device comprising:
a transmitter that is configured to transmit data; and
a controller configured to provide a data packet in a transmit buffer and provide a delay bound time period within which the data packet should be transmitted after being provided in the transmit buffer, wherein if there is insufficient time to transmit the data packet before expiration of the delay bound time period, the controller flushes the data packet without initiating transmission of the data packet from the transmitter, and wherein if there is sufficient time to transmit the data packet, the controller adapted to provide a maximum queue time period for the data packet between a time of providing the data packet in the transmit buffer and a time of selecting the data packet for transmission, determining if an actual queue time period for the data packet exceeds the maximum queue time period, and if the actual queue time period exceeds the maximum queue time period, determining that there is insufficient time to transmit the data packet before expiration of the delay bound time period.

10. A communications device according to claim 9 wherein the controller assigns a timestamp to the data packet in the transmit buffer corresponding to an output of a transmit clock when the data packet is provided in the transmit buffer, and wherein the controller determines the actual queue time period as a difference between the timestamp assigned to the data packet and an output of the transmit clock when the data packet is selected for transmission.

11. A communications device according to claim 10 wherein providing a data packet in the transmit buffer comprises providing a plurality of data packets in the transmit buffer and wherein assigning a timestamp comprises assigning a respective timestamp to each of the plurality of data packets wherein each timestamp represents a time that the respective data packet was provided in the transmit buffer.

12. A communications device according to claim 11 wherein providing a maximum queue time period comprises providing a respective maximum queue time period for each of the plurality of data packets.

13. A communications device according to claim 12 wherein a first maximum queue time period for a first of the data packets is different than a second maximum queue time period for a second of the data packets.

14. A communications device according to claim 11 wherein an order of the data packets in the transmit buffer corresponds to an order of the timestamps assigned thereto.

* * * * *

UNITED STATES PATENT AND TRADEMARK OFFICE
CERTIFICATE OF CORRECTION

| | | |
|---|---|---|
| PATENT NO. | : 7,177,274 B2 | Page 1 of 1 |
| APPLICATION NO. | : 10/174840 | |
| DATED | : February 13, 2007 | |
| INVENTOR(S) | : Thomas Martinus Van Der Zee, et al. | |

It is certified that error appears in the above-identified patent and that said Letters Patent is hereby corrected as shown below:

In Column 6, Line 44, delete "Audio/Nideo" and insert -- Audio/Video --, therefor.

In Column 14, Line 3, in Claim 8, after "controller" delete "defines".

In Column 13, Line 48, in Claim 8, delete "flushes" and insert -- being adapted to flush --, therefor.

Signed and Sealed this

Third Day of June, 2008

JON W. DUDAS
*Director of the United States Patent and Trademark Office*